United States Patent
Tomita (10) Patent No.: US 11,431,080 B2
(45) Date of Patent: Aug. 30, 2022

(54) RADIO COMMUNICATION MODULE

(71) Applicant: Fujikura Ltd., Tokyo (JP)

(72) Inventor: Michikazu Tomita, Sakura (JP)

(73) Assignee: FUJIKURA LTD., Tokyo (JP)

( * ) Notice: Subject to any disclaimer, the term of this patent is extended or adjusted under 35 U.S.C. 154(b) by 30 days.

(21) Appl. No.: 17/265,249

(22) PCT Filed: Jan. 8, 2021

(86) PCT No.: PCT/JP2021/000429
§ 371 (c)(1),
(2) Date: Feb. 2, 2021

(87) PCT Pub. No.: WO2021/240861
PCT Pub. Date: Dec. 2, 2021

(65) Prior Publication Data
US 2022/0190463 A1 Jun. 16, 2022

(30) Foreign Application Priority Data
May 26, 2020 (JP) .............................. JP2020-091692

(51) Int. Cl.
*H01Q 23/00* (2006.01)
*H01Q 1/22* (2006.01)
(Continued)

(52) U.S. Cl.
CPC ............. *H01Q 1/2283* (2013.01); *H01Q 1/02* (2013.01); *H01Q 1/2208* (2013.01); *H01Q 1/38* (2013.01)

(58) Field of Classification Search
CPC ...... H01Q 1/2283; H01Q 1/02; H01Q 1/2208; H01Q 1/38; H01Q 1/243; H01Q 21/065;
(Continued)

(56) References Cited

U.S. PATENT DOCUMENTS

2009/0166072 A1* 7/2009 Fuji ..................... H05K 1/0206
29/832
2010/0141350 A1* 6/2010 Sasaki ................. H05K 1/0207
333/1.1
(Continued)

FOREIGN PATENT DOCUMENTS

JP 2009-38696 A 2/2009
JP 2009-158744 A 7/2009
(Continued)

OTHER PUBLICATIONS

International Search Report dated Apr. 6, 2021, issued in counterpart Application No. PCT/JP2021/000429. (2 pages).

*Primary Examiner* — David E Lotter
(74) *Attorney, Agent, or Firm* — WHDA, LLP (57) ABSTRACT

A radio communication module of the invention includes: a mounting substrate having a first surface and a second surface; an antenna substrate mounted on the first surface; and an IC package that is mounted on the second surface and includes an RFIC. The mounting substrate includes a heat-dissipation via hole penetrating through the mounting substrate and extending between the first surface and the second surface, a heat dissipation pattern formed on the first surface and is connected to the heat-dissipation via hole, and a non-heat-dissipation via hole transmitting an electrical signal or electrical current, which are formed on thereon. In a plan view when viewed from the thickness direction of the mounting substrate, the heat-dissipation via hole is connected to the RFIC at a position at which the heat-dissipation via hole overlaps with the RFIC, and the heat dissipation pattern extends to an outside of the antenna substrate.

9 Claims, 6 Drawing Sheets

(51) Int. Cl.
*H01Q 1/38* (2006.01)
*H01Q 1/02* (2006.01)

(58) Field of Classification Search
CPC ........ H01Q 1/48; H01Q 9/0414; H01Q 21/28; H01L 23/66; H01L 2223/6677; H05K 2201/10098; H05K 1/0243
See application file for complete search history.

(56) References Cited

U.S. PATENT DOCUMENTS

| | | | |
|---|---|---|---|
| 2010/0225539 A1* | 9/2010 | Margomenos | G01S 7/032 |
| | | | 342/373 |
| 2019/0355680 A1* | 11/2019 | Chuang | H01L 23/5389 |
| 2020/0373244 A1* | 11/2020 | Kang | H01L 23/5389 |
| 2021/0091450 A1* | 3/2021 | Park | H01Q 1/243 |

FOREIGN PATENT DOCUMENTS

| | | |
|---|---|---|
| JP | 2019-97026 A | 6/2019 |
| WO | 2008/129923 A1 | 10/2008 |

* cited by examiner

RADIO COMMUNICATION MODULE

TECHNICAL FIELD

The present invention rerates to a radio communication module.

This application claims priority from Japanese Patent Application No. 2020-091692 filed on May 26, 2020, the contents of which are incorporated herein by reference in their entirety.

BACKGROUND ART

Patent Document 1 discloses a radio communication module including an antenna substrate (first dielectric substrate) having an antenna element and an RFIC mounted on the antenna substrate.

PRIOR ART DOCUMENTS

Patent Documents

[Patent Document 1] Japanese Unexamined Patent Application, First Publication No. 2019-97026

SUMMARY OF THE INVENTION

Problems to be Solved by the Invention

In order to ensure performance a radio communication module, it is required to effectively dissipate heat from an RFIC and cool down the RFIC. In the configuration disclosed in Patent Document 1, since an RFIC is directly mounted on an antenna substrate, there is a case where it is difficult to ensure a heat dissipation route due to the reason that wirings of the antenna substrate are densely disposed thereon.

The invention was made in view of the above-described situation, and has an object to provide a radio communication module that ensures a heat dissipation route of an RFIC and can effectively cool down the RFIC.

Means for Solving the Problems

In order to solve the above-described problems, a radio communication module according to an aspect of the invention includes: a mounting substrate having a first surface and a second surface; an antenna substrate mounted on the first surface; and an IC package that is mounted on the second surface and includes an RFIC. The mounting substrate includes a heat-dissipation via hole that penetrates through the mounting substrate and extends between the first surface and the second surface, a heat dissipation pattern that is formed on the first surface and is connected to the heat-dissipation via hole, and a non-heat-dissipation via hole that transmits an electrical signal or electrical current, which are formed on thereon. In a plan view when viewed from the thickness direction of the mounting substrate, the heat-dissipation via hole is connected to the RFIC at a position at which the heat-dissipation via hole overlaps the RFIC, and the heat dissipation pattern extends to an outside of the antenna substrate.

According to the aforementioned aspect, the mounting substrate is prepared differentially from the antenna substrate, and the heat-dissipation via hole is disposed on the mounting substrate at the position at which the heat-dissipation via hole overlaps the RFIC when viewed in a plan view. Consequently, wirings of the antenna substrate are not densely disposed thereon, and heat generated from the RFIC is effectively transmitted to the heat-dissipation via hole. Furthermore, the heat-dissipation via hole is connected to the heat dissipation pattern, and the heat dissipation pattern extends to the outside of the antenna substrate when viewed in a plan view. Because of this, it is possible to form the heat dissipation pattern on a wide region of the first surface of the mounting substrate. As mentioned above, a heat dissipation route is ensured by use of the heat-dissipation via hole and the heat dissipation pattern, heat is dissipated to air via the heat dissipation pattern, and therefore it is possible to effectively cool down the RFIC.

Here, a gap may be provided between the antenna substrate and the mounting substrate.

Additionally, the antenna substrate includes a second heat dissipation pattern that is formed on an opposed face of the antenna substrate which faces the mounting substrate, and the second heat dissipation pattern may be connected to the heat dissipation pattern.

Furthermore, an underfill are provided around a connection portion between the second heat dissipation pattern and the heat dissipation pattern, and the underfill may be in contact with the second heat dissipation pattern and the heat dissipation pattern.

Moreover, a plurality of connection portions are provided, each of which connects the second heat dissipation pattern to the heat dissipation pattern, and when viewed in a plan view, the plurality of the connection portions may be disposed at both a central part and an outer-peripheral part of the antenna substrate.

In addition, the antenna substrate includes an antenna terminal that transmits a signal between the antenna substrate and the RFIC, and when viewed in a plan view, the antenna terminal may be disposed between the connection portion that is disposed at the central part and the connection portion that is disposed at the outer-peripheral part.

Additionally, a first heatsink member may be provided on a surface of the IC package which is opposite to the mounting substrate.

Furthermore, a second heatsink member may be provided at a position different from the antenna substrate on a surface of the heat dissipation pattern in the plan view.

Additionally, the heat dissipation pattern may have the same electrical potential as that of GND.

Effects of the Invention

According to the above-mentioned aspect, it is possible to provide a radio communication module in which wirings of the antenna substrate are not densely disposed thereon, the heat dissipation route of the RFIC is ensured, and it is possible to effectively cool down the RFIC.

EMBODIMENTS FOR CARRYING OUT THE INVENTION

First Embodiment

Hereinafter, a radio communication module according to a first embodiment will be described with reference to the drawings.

Figure 1:
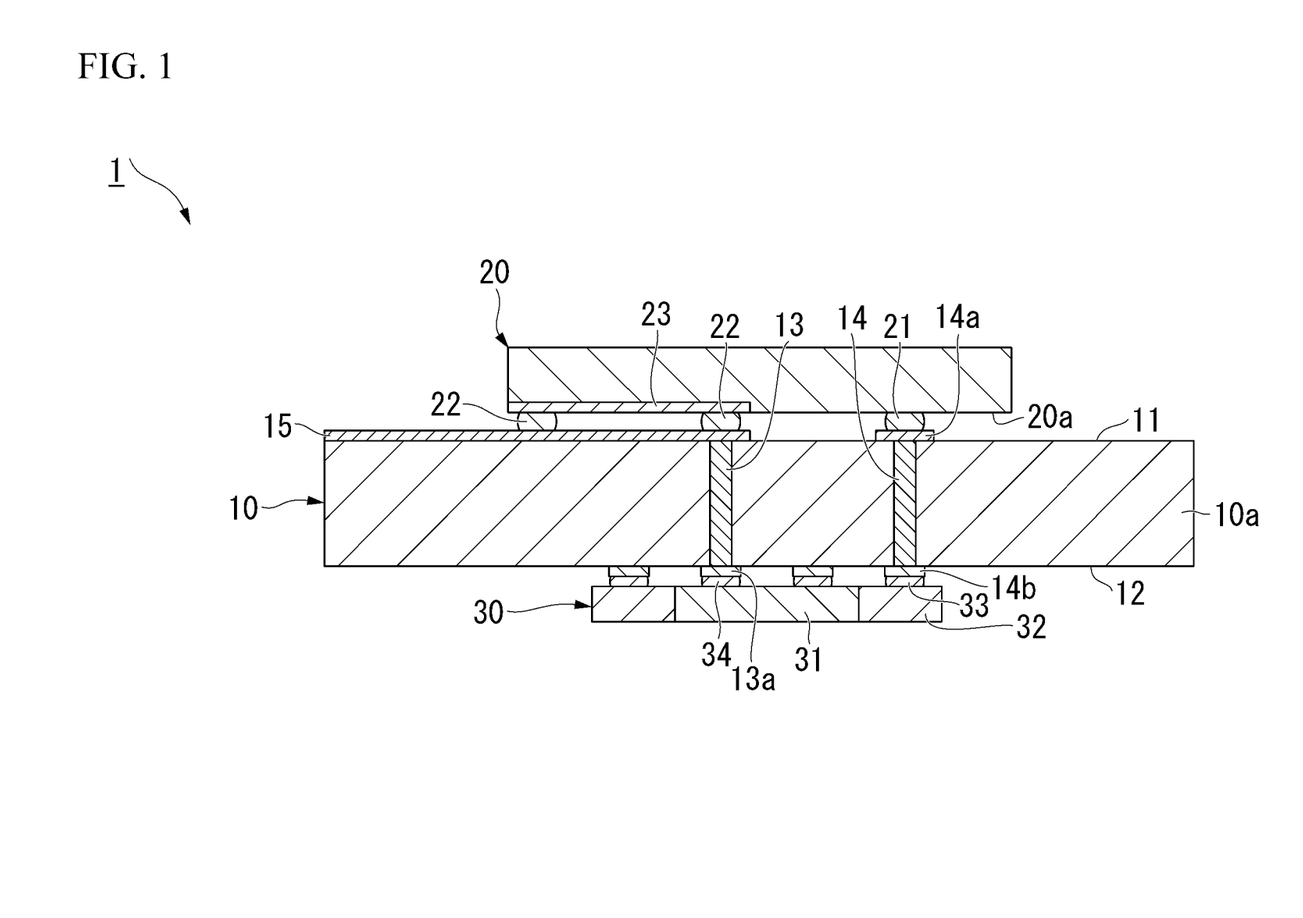
FIG. 1 is a cross-sectional view showing a radio communication module according to a first embodiment.

As shown in FIG. 1, a radio communication module 1 includes a mounting substrate 10, an antenna substrate 20, and an IC package 30. The mounting substrate 10 has a first surface 11 and a second surface 12. The antenna substrate 20 is mounted on the first surface 11 and the IC package 30 is mounted on the second surface 12.

(Definition of Direction)

In the embodiment, a thickness direction of the mounting substrate 10 is referred to as a vertical direction. The first surface 11 and the second surface 12 extend along a plane orthogonal to the vertical direction. Additionally, viewing from the vertical direction is referred to as plan view.

Figure 3:
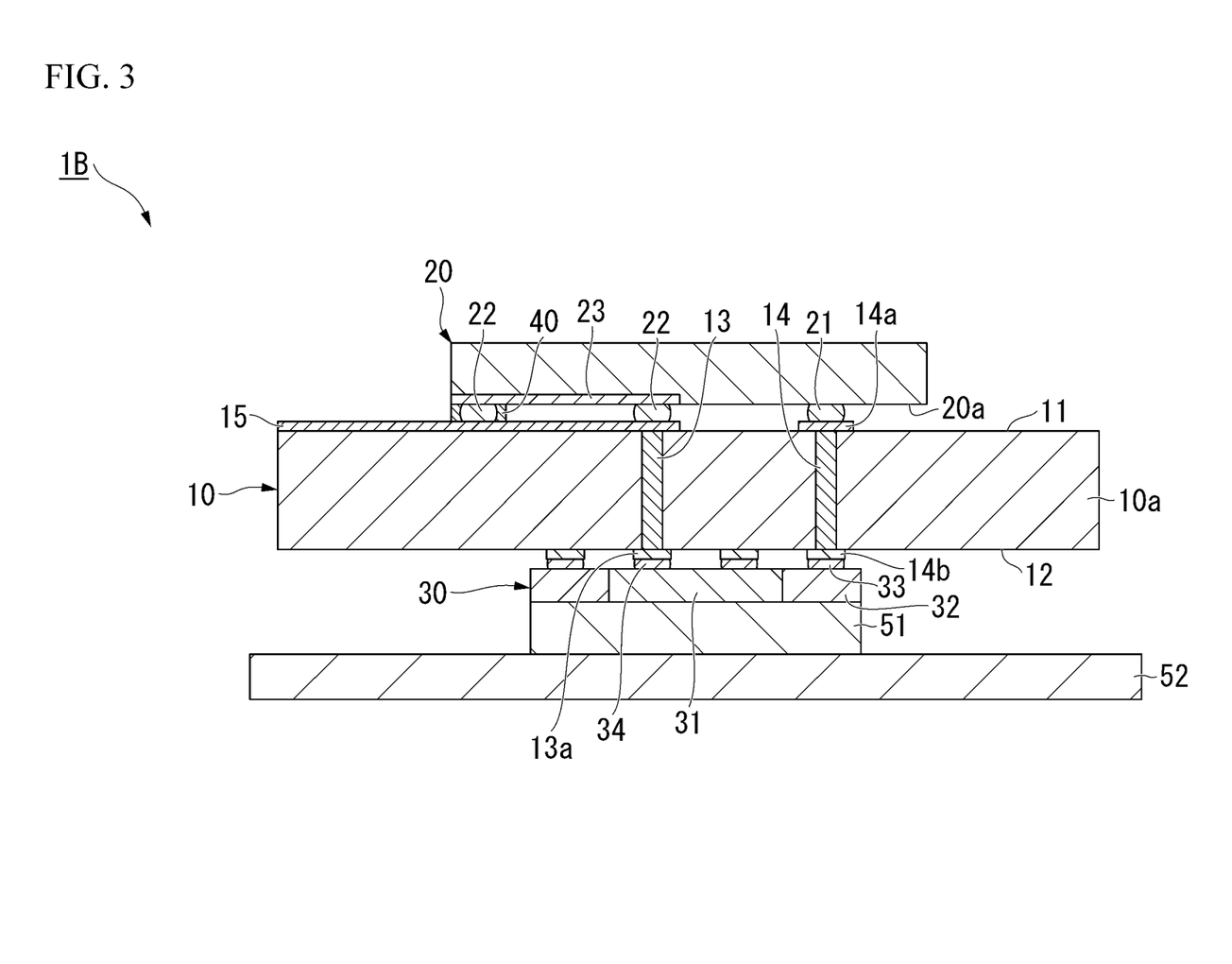
FIG. 3 is a cross-sectional view showing a radio communication module according to a third embodiment.
Figure 4:
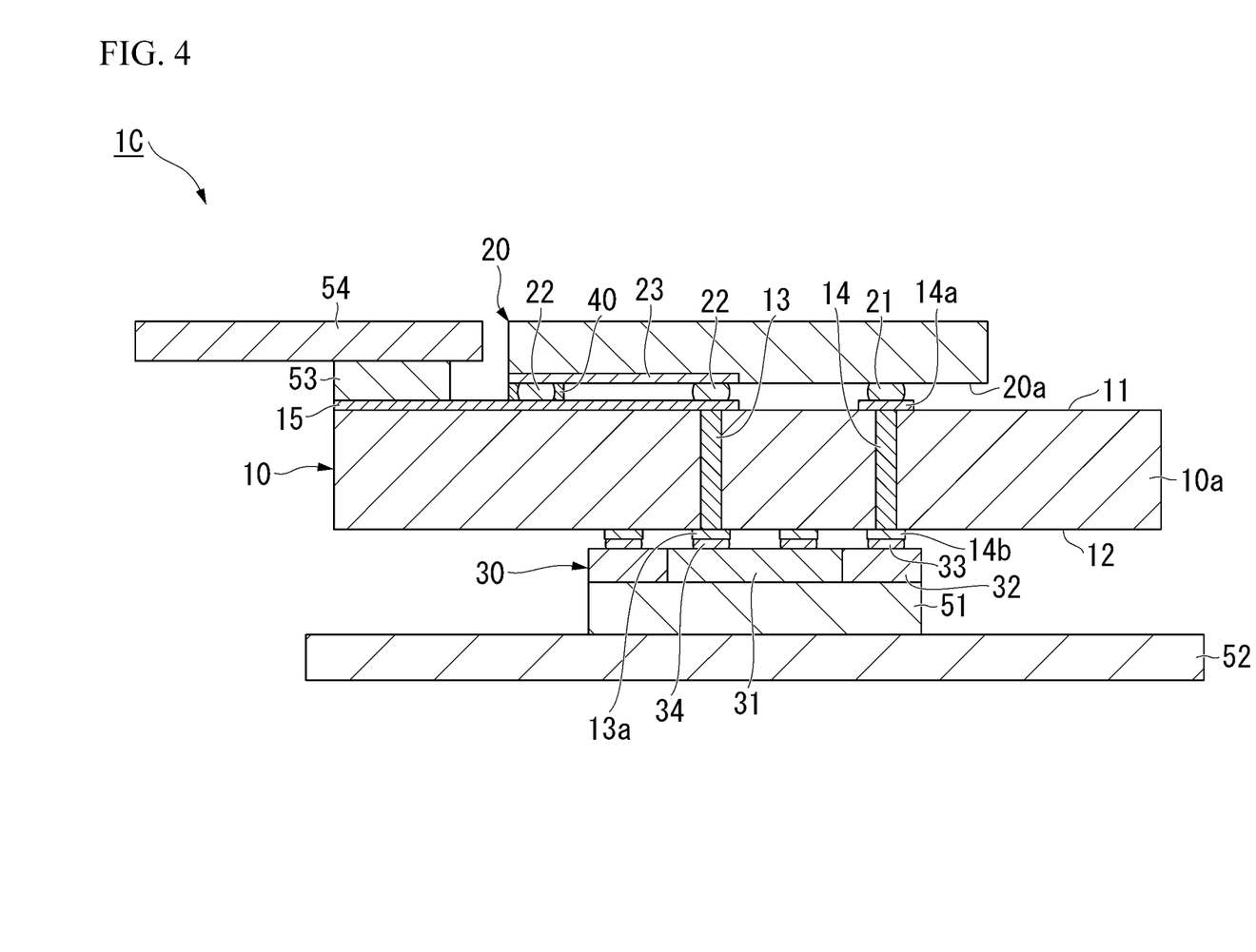
FIG. 4 is a cross-sectional view showing a radio communication module according to a fourth embodiment.
Figure 5:
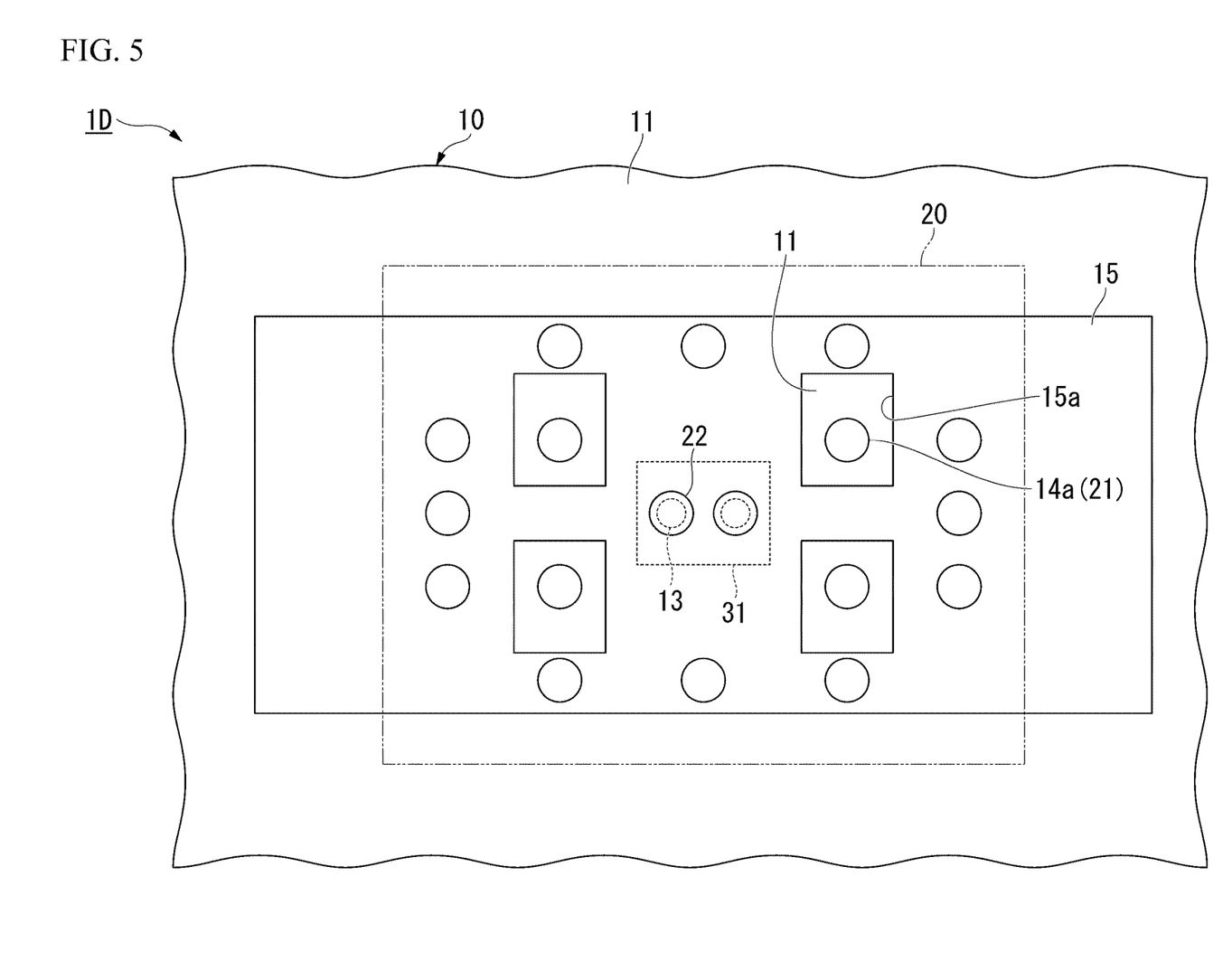
FIG. 5 is a plan view showing a radio communication module according to a fifth embodiment.
Figure 6:
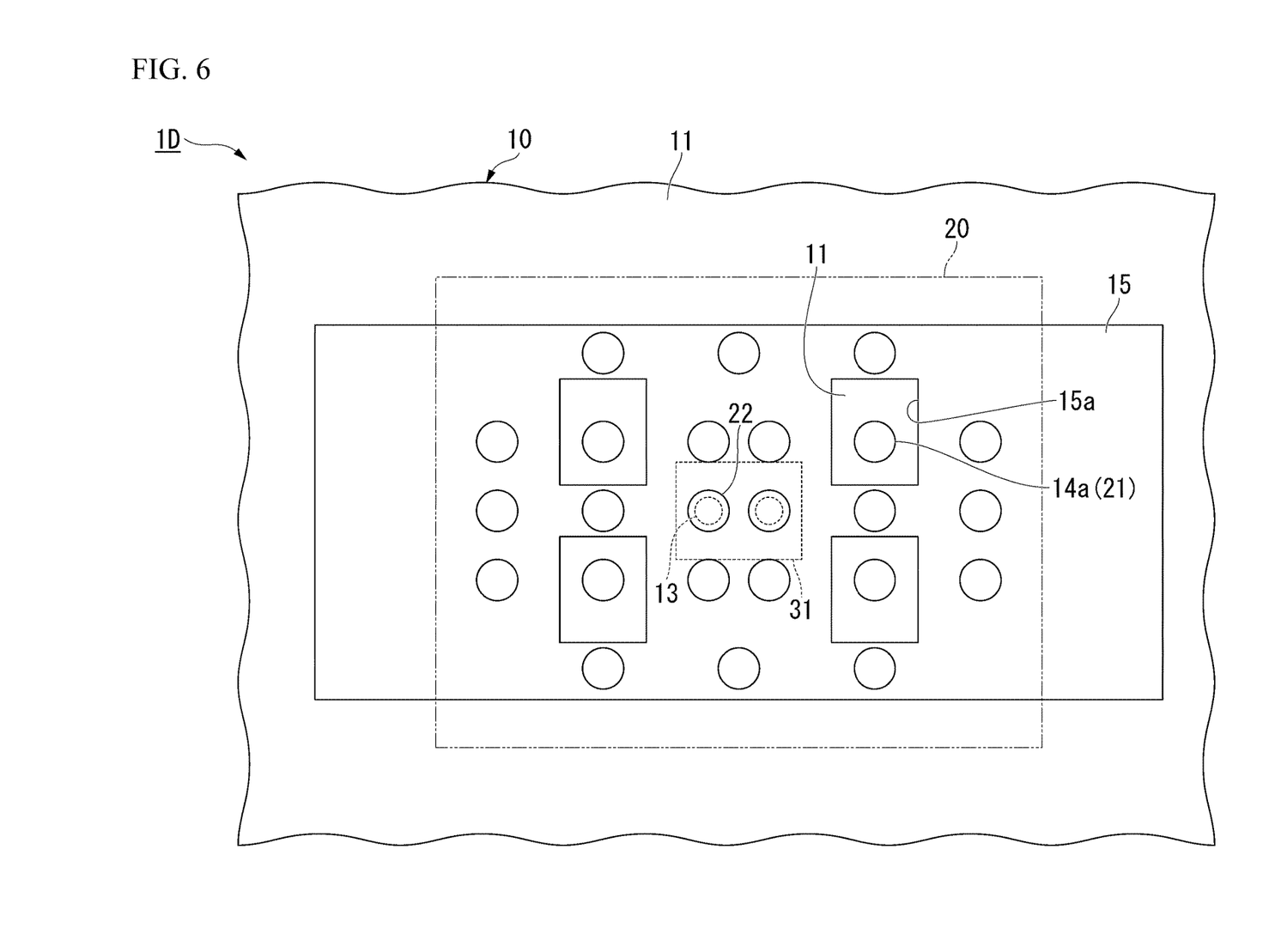
FIG. 6 is a plan view showing a modified example of the radio communication module according to the fifth embodiment.

FIGS. 1 to 4 are cross-sectional views in the vertical direction, and FIGS. 5 and 6 are plan views when viewed in the vertical direction.

(IC Package)

The IC package 30 is mounted on the mounting substrate 10 so as to face the second surface 12 of the mounting substrate 10. The IC package 30 includes an RFIC 31, a package 32, a first IC terminal 33, and a second IC terminal 34. The RFIC 31 is a high-frequency integrated circuit (RFIC: Radio Frequency Integrated Circuit) that processes a high-frequency signal in a millimeter waveband or the like. A gap is provided between the IC package 30 and the mounting substrate 10 in the vertical direction. The first IC terminal 33 and the second IC terminal 34 are disposed in the gap. As stated above, since air exists at the periphery of the IC package 30, it is possible to reduce the transmission loss of a high-frequency signal. For the similar reason, it is preferable that no resin such as an underfill be used on the periphery or the like of the IC package 30. However, in a limited portion through which a high-frequency signal does not pass, an underfill or the like may be used.

The package 32 is used to electrically connect the RFIC 31 to the mounting substrate 10 and includes wirings or lead wires. When viewed from the vertical direction, the RFIC 31 is located at a central part of the IC package 30. In other words, when viewed from the vertical direction, the package 32 is disposed so as to surround the RFIC 31.

The IC package 30 may be a BGA (Ball Grid Alley), a CSP (Chip Size Package), or an FOWLP (Fan Out Wafer Level Package). For example, in the case in which the IC package 30 is the BGA, the first IC terminal 33 and the second IC terminals 34 are each a solder ball that was re-solidified after melted. The second IC terminal 34 is a terminal connected to a heat-dissipation via hole 13 which will be described later. The first IC terminal 33 is the other terminal. The number of first IC terminals 33 and the second IC terminals 34 are not limited, the number of the terminals thereof may be one or may be two or more. The first IC terminal 33 may be connected to a non-heat-dissipation via hole 14 which will be described later.

(Mounting Substrate)

The mounting substrate 10 includes a body part 10a, the heat-dissipation via hole 13, the non-heat-dissipation via hole 14, and a heat dissipation pattern 15. The body part 10a is formed of an insulator. As a material of the body part 10a, for example, epoxy, polyimide, or the like can be used, but other resin materials or the like may be used. The thickness of the body part 10a is not particularly limited, and is, for example, approximately 1.6 mm. When providing the heat-dissipation via hole 13 and the non-heat-dissipation via hole 14 in the case of forming microscopic through holes (for example, having a diameter of 0.1 mm) in the body part 10a by drilling, the body part 10a also can be thin, for example, approximately 0.8 mm. Wirings may be formed inside the body part 10a.

The heat-dissipation via hole 13 and the non-heat-dissipation via hole 14 extend in the vertical direction between the first surface 11 and the second surface 12 and penetrate through the mounting substrate 10. The heat-dissipation via hole 13 is a via hole that is provided to transmit heat from the second surface 12 to the first surface 11. The non-heat-dissipation via hole 14 is a via hole that is provided to transmit an electrical signal or an electrical current (driving current or the like).

The heat-dissipation via hole 13 is connected to the second IC terminal 34 via a heat transfer land 13a. The heat transfer land 13a is formed immediately above the heat-dissipation via hole 13 on the second surface 12 of the mounting substrate 10. The heat-dissipation via hole 13 is connected to the heat dissipation pattern 15 on the first surface 11 of the mounting substrate 10. With this configuration, the heat generated from the RFIC 31 is transmitted to the heat dissipation pattern 15 via the second IC terminal 34, the heat transfer land 13a, and the heat-dissipation via hole 13. As the heat dissipation pattern 15 and the heat-dissipation via hole 13, it is preferable to use a material with a high coefficient of thermal conductivity such as copper or the like.

The heat-dissipation via hole 13 may be connected to a GND circuit. In this case, the heat-dissipation via hole 13 and the heat dissipation pattern 15 have the same electrical potential as that of the GND. Additionally, the non-heat-dissipation via hole 14 may have a coaxial structure. This configuration is effective to use a material with low dielectric property such as a general FR4 or the like as the body part 10a of the mounting substrate 10.

In the example shown in FIG. 1, the non-heat-dissipation via hole 14 electrically connects the antenna substrate 20 to the IC package 30 via an antenna terminal 21, a first land 14a, a second land 14b, and the first IC terminal 33. However, the non-heat-dissipation via hole 14 may be electrically connected to only one of the antenna substrate 20 and the IC package 30. Moreover, the non-heat-dissipation via hole 14 that is not electrically connected to both the antenna substrate 20 and the IC package 30 may be provided.

The heat-dissipation via hole 13 is not for the purpose of transmitting a signal, an electrical current of a power source, or the like, is disposed at the position at which the heat-dissipation via hole 13 overlaps the RFIC 31 serving as a heat source when viewed in a plan view, and is connected to the heat dissipation pattern 15. The heat-dissipation via hole 13 may have the same electrical potential as that of GND.

The heat dissipation pattern 15 is formed on the first surface 11 and is connected to the heat-dissipation via hole 13. Therefore, the heat transmitted from the RFIC 31 to the heat-dissipation via hole 13 is also transmitted to the heat dissipation pattern 15.

It is preferable that the heat dissipation pattern 15 is formed so as to have a thickness greater than or equal to a predetermined thickness in order to sufficiently obtain a heat dissipation effect. For example, in the case in which the material of the heat dissipation pattern 15 is copper, it is preferable that the thickness of the heat dissipation pattern 15 be greater than or equal to 35 μm.

In the embodiment, in order to sufficiently ensure the area of the heat dissipation pattern 15, the IC package 30 is mounted on the mounting substrate 10 not on the antenna substrate 20. Since the IC package 30 is mounted on the mounting substrate 10, wirings necessary for connection with respect to the antenna substrate 20 and wirings used to transmit and receive a signal (a digital signal, low-frequency signal, power source, or the like) other than a high-frequency signal can be arranged at the portion other than the antenna substrate 20 (for example, the inside of the body part 10a of the mounting substrate 10 or the like).

Moreover, if the RFIC 31 is mounted on the antenna substrate 20, the signal lines on the antenna substrate 20 are densely disposed, and it is difficult to ensure a heat dissipation route of the RFIC 31. In contrast, like the embodiment, it is easy to ensure the heat dissipation route by mounting the RFIC 31 on the second surface 12 of the mounting substrate 10 which is opposite to the first surface 11 on which the antenna substrate 20 is mounted.

(Antenna Substrate)

The antenna substrate 20 is mounted on the mounting substrate 10 so as to face the first surface 11 of the mounting substrate 10. An antenna pattern which is not shown in the drawings is formed on the antenna substrate 20. The antenna pattern is formed on a surface of the antenna substrate 20 or inside thereof. It is preferable that a material used to form the antenna substrate 20 have a high transmission property of the high-frequency signal (a low dielectric dissipation factor). Specifically, fluorine resin, LCP (Liquid Crystal Polymer), polyphenylene ether (PPE), low-temperature firing ceramics, or the like is adopted. However, a material other than the above-mentioned materials may be selected. It is preferable that the other components are not mounted on the antenna substrate 20 in terms of reliability and reduction in the surface area occupied by such components, but components may be mounted on the antenna substrate 20 as needed.

The antenna pattern of the antenna substrate 20 is electrically connected to the RFIC 31 via the antenna terminal 21. More particularly, the antenna pattern is electrically connected to the RFIC 31 via the antenna terminal 21, the first land 14a, the non-heat-dissipation via hole 14, the second land 14b, and the first IC terminal 33. Note that, the antenna pattern may be electrically connected to the RFIC 31 via another route.

The connection portion between the antenna terminal 21 and the first land 14a of the non-heat-dissipation via hole 14 and the periphery of the connection portion may be reinforced using a resin material or the like. However, it is preferable that air exist around the antenna terminal 21 to which a high-frequency signal is transmitted in terms of reduction in the loss of a signal.

A second heat dissipation pattern 23 is formed on an opposed face 20a of the antenna substrate 20 which faces the mounting substrate 10 in the vertical direction. The second heat dissipation pattern 23 is connected to the heat dissipation pattern 15 via the connection portion 22. As the second heat dissipation pattern 23, it is preferable to use a material with a high coefficient of thermal conductivity such as copper or the like. Similar to the heat dissipation pattern 15, it is preferable that the second heat dissipation pattern 23 have a thickness greater than or equal to a predetermined thickness in order to obtain a heat dissipation effect (for example, greater than or equal to 35 μm in the case of copper).

The first land 14a and the second land 14b are disposed immediately above the non-heat-dissipation via hole 14. Furthermore, the antenna terminal 21 is disposed immediately above the first land 14a, and the first IC terminal 33 is disposed immediately above the second land 14b. As described above, it is preferable that the connection structure of the antenna substrate 20 and the IC package 30 is a so-called Pad-on-via. Consequently, the effect of reducing a transmission distance of a high-frequency signal and minimizing the loss of a signal is obtained.

The IC package 30 is mounted on the mounting substrate 10 via the first IC terminal 33 and the second IC terminal 34. The antenna substrate 20 is mounted on the mounting substrate 10 via the antenna terminal 21 and the connection portion 22. Mounting of the antenna substrate 20 and the IC package 30 on the mounting substrate 10 may be carried out by solder connection. In this case, the antenna terminal 21, the connection portion 22, the first IC terminal 33, and the second IC terminal 34 are each solder that was re-solidified after melted. However, a method other than solder connection (for example, ultrasonic connection, pressure bonding by pressurization, or the like) may be selected. Solder (SnAgCu solder or the like), gold, silver, copper, or the like can be used as materials of the antenna terminal 21, the connection portion 22, the first IC terminal 33, the second IC terminal 34.

Here, it is required to effectively dissipate the heat generated from the IC package 30 and cool down the IC package 30 in order to ensure performance of the radio communication module 1. Additionally, heat generation in the IC package 30 mainly occurs in the RFIC 31.

For this reason, in the embodiment, the heat-dissipation via hole 13 is disposed at the position at which the heat-dissipation via hole 13 overlaps the RFIC 31 when viewed in a plan view. Because of this, heat generated in the RFIC 31 of the IC package 30 is effectively transmitted to the heat-dissipation via hole 13. Furthermore, the heat-dissipation via hole 13 is connected to the heat dissipation pattern 15, and the heat dissipation pattern 15 extends to an outside of the antenna substrate 20 when viewed in a plan view. Accordingly, it is possible to form the heat dissipation pattern 15 on a wide region of the first surface 11 of the mounting substrate 10. As a result, heat is dissipated to air via the heat dissipation pattern 15, and it is possible to effectively cool down the RFIC 31.

As described above, the radio communication module 1 according to the embodiment includes the mounting substrate 10 having the first surface 11 and the second surface 12, the antenna substrate 20 mounted on the first surface 11, and the IC package 30 that is mounted on the second surface 12 and includes the RFIC 31. The heat-dissipation via hole 13 that penetrates through the mounting substrate 10 and extends between the first surface 11 and the second surface 12, the heat dissipation pattern 15 that is formed on the first surface 11 and is connected to the heat-dissipation via hole 13, and the non-heat-dissipation via hole 14 that transmits an electrical signal or electrical current are formed on the mounting substrate 10. Furthermore, the mounting substrate 10 is prepared differentially from the antenna substrate 20, when viewed in a plan view from the thickness direction of the mounting substrate 10, the heat-dissipation via hole 13 is connected to the RFIC 31 at the position at which the heat-dissipation via hole 13 overlaps the RFIC 31, and the heat dissipation pattern 15 extends to the outside of the antenna substrate 20. For this reason, wirings of the antenna substrate 20 are not densely disposed thereon, the heat dissipation route is ensured by use of the heat-dissipation via hole 13 and the heat dissipation pattern 15, heat is dissipated to air via the heat dissipation pattern 15, and therefore it is possible to effectively cool down the RFIC 31.

Furthermore, a gap in the vertical direction is provided between the antenna substrate 20 and the mounting substrate 10. Consequently, the heat dissipation pattern 15 comes into contact with air on a wider surface area, heat is effectively dissipated thereto, the antenna substrate 20 is surrounded by air, and it is thereby possible to minimize the transmission loss of a high-frequency signal.

Moreover, the second heat dissipation pattern 23 is formed on the opposed face 20a of the antenna substrate 20 which faces the mounting substrate 10, and the second heat dissipation pattern 23 is connected to the heat dissipation pattern 15 by the connection portion 22. Accordingly, the heat of the RFIC 31 is dissipated via not only the heat dissipation pattern 15 but also the second heat dissipation pattern 23, and it is possible to further effectively cool down the RFIC 31.

In addition, the heat dissipation pattern 15 may have the same electrical potential as that of GND. In this case, the GND pattern that is formed on the mounting substrate 10 for impedance matching or the like can be used as the heat dissipation pattern 15. Because of this, it is possible to obtain the heat dissipation effect due to the heat dissipation pattern 15 without increasing the surface area of the mounting substrate 10.

Second Embodiment

Next, the second embodiment according to the invention will be described. The configuration of the second embodiment is basically similar to that of the first embodiment. Therefore, identical reference numerals are used for the configurations which are identical to those of the first embodiment and the explanations thereof are omitted, and the point in that the second embodiment is different from the first embodiment will only be described here.

Figure 2:
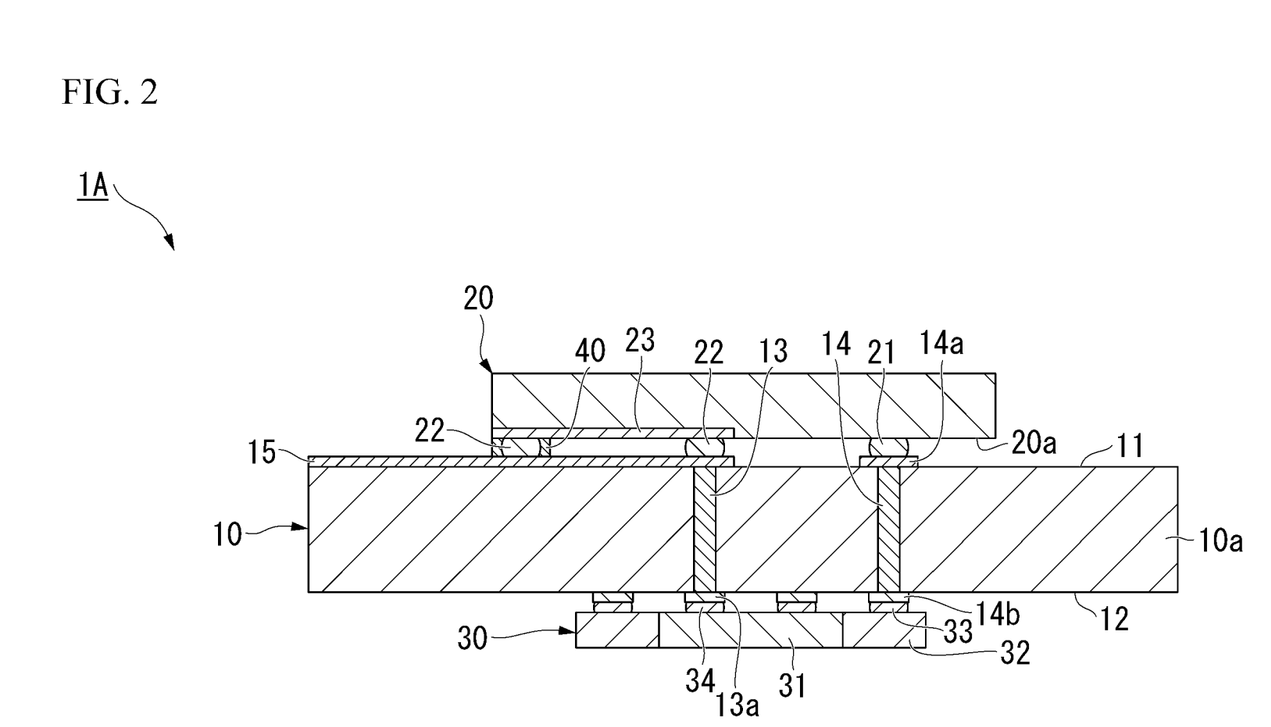
FIG. 2 is a cross-sectional view showing a radio communication module according to a second embodiment.

As shown in FIG. 2, a radio communication module 1A according to the embodiment includes an underfill 40.

The underfill 40 is provided around the connection portion 22 between the heat dissipation pattern 15 and the second heat dissipation pattern 23. Furthermore, the underfill 40 is in contact with both the heat dissipation pattern 15 and the second heat dissipation pattern 23. For this reason, it is possible to transmit heat from the heat dissipation pattern 15 to the second heat dissipation pattern 23 via not only the connection portion 22 but also the underfill 40. Therefore, it is possible to further effectively dissipate the heat of the RFIC 31. As a material of the underfill 40, resin or the like can be adopted.

Note that, since a high-frequency signal does not pass through the heat dissipation pattern 15, the connection portion 22, and the second heat dissipation pattern 23, reduction in the transmission loss of a high-frequency signal can be avoided even where the underfill 40 is provided.

Third Embodiment

Next, the third embodiment according to the invention will be described. The configuration of the third embodiment is basically similar to that of the first embodiment. Therefore, identical reference numerals are used for the configurations which are identical to those of the first embodiment and the explanations thereof are omitted, and the point in that the third embodiment is different from the first embodiment will only be described here.

As shown in FIG. 3, a radio communication module 1B according to the embodiment includes a first heatsink member 51 and an auxiliary heatsink member 52.

The first heatsink member 51 is in contact with a surface of the IC package 30 which is opposite to the mounting substrate 10. The auxiliary heatsink member 52 is in contact with a surface of the first heatsink member 51 which is opposite to the IC package 30. In other words, the first heatsink member 51 is sandwiched between the IC package 30 and the auxiliary heatsink member 52. When viewed in a plan view, the auxiliary heatsink member 52 has a surface area wider than those of the IC package 30 and the first heatsink member 51. The first heatsink member 51 may be, for example, a heat dissipation sheet, adhesive, or the like. The auxiliary heatsink member 52 may be, for example, metal or the like.

As stated above, in the embodiment, the first heatsink member 51 is provided on the surface of the IC package 30 which is opposite to the mounting substrate 10. Consequently, the heat generated from the RFIC 31 can be dissipated in air via the first heatsink member 51. Accordingly, it is possible to further effectively cool down the RFIC 31. Moreover, in the case in which the auxiliary heatsink member 52 is further provided, it is possible to dissipate the heat also by the auxiliary heatsink member 52. Note that, the auxiliary heatsink member 52 may be omitted. Furthermore, the surface area of the first heatsink member 51 when viewed in a plan view may be larger than that of the IC package 30.

Fourth Embodiment

Next, the fourth embodiment according to the invention will be described. The configuration of the fourth embodiment is basically similar to that of the third embodiment. Therefore, identical reference numerals are used for the configurations which are identical to those of the third embodiment and the explanations thereof are omitted, and the point in that the fourth embodiment is different from the third embodiment will only be described here.

As shown in FIG. 4, a radio communication module 1C according to the embodiment includes a second heatsink member 53 and a second auxiliary heatsink member 54.

The second heatsink member 53 is provided above the first surface 11 of the mounting substrate 10 so as to come into contact with the heat dissipation pattern 15. Furthermore, the second auxiliary heatsink member 54 is in contact with the second heatsink member 53. When viewed in a plan view, the second heatsink member 53 and the second auxiliary heatsink member 54 are disposed at the position different from that of the antenna substrate 20. When viewed in a plan view, the second auxiliary heatsink member 54 has a surface area wider than that of the second heatsink member 53. The second heatsink member 53 may be, for example, a heat dissipation sheet, adhesive, or the like. The second auxiliary heatsink member 54 may be, for example, metal or the like.

As stated above, in the embodiment, when viewed in a plan view, the second heatsink member 53 is provided at the position different from that of the antenna substrate 20 on the surface of the heat dissipation pattern 15. Consequently, the heat generated from the RFIC 31 can be dissipated in air via the second heatsink member 53. Accordingly, it is possible to further effectively cool down the RFIC 31. Moreover, in the case in which the second auxiliary heatsink member 54 is further provided, it is possible to dissipate the heat also by the second auxiliary heatsink member 54. Note that, the second auxiliary heatsink member 54 may be omitted.

Fifth Embodiment

Next, the fifth embodiment according to the invention will be described. In the embodiment, specific examples of the arrangements of the connection portion 22 or the antenna terminal 21 of the aforementioned first to fourth embodiments will be described with reference to FIGS. 5 and 6. Note that, in FIGS. 5 and 6, a radio communication module 1D is viewed from the upper side thereof, and the outline of the antenna substrate 20 is only represented by a broken line. In FIGS. 5 and 6, a plurality of openings 15*a* are formed on the heat dissipation pattern 15, and the first land 14*a* of the non-heat-dissipation via hole 14 and the antenna terminal 21 are disposed inside each opening 15*a*. The connection portion 22 is provided on the heat dissipation pattern 15 (at the portion other than the opening 15*a*).

As shown in FIG. 5, the connection portion 22 that connects the heat dissipation pattern 15 to the second heat dissipation pattern 23 (refer to FIG. 1 or the like) is preferably disposed at both a central part and an outer-peripheral part of the antenna substrate 20 when viewed in a plan view. In FIG. 5, two connection portions 22 are disposed at the central part of the antenna substrate 20. Moreover, in FIG. 5, two heat-dissipation via holes 13 are formed on the mounting substrate 10, and two connection portions 22 located at the central part are disposed immediately above the respective heat-dissipation via holes 13 when viewed in a plan view. Furthermore, twelve connection portions 22 are disposed on the outer-peripheral part of the antenna substrate 20. Consequently, the heat generated from the RFIC 31 is transmitted to the second heat dissipation pattern 23 through a plurality of routes (the plurality of the connection portions 22), and it is possible to further effectively dissipate the heat.

Moreover, as shown in FIG. 5, when viewed in a plan view, the antenna terminal 21 that transmits a signal between the antenna terminal and the RFIC 31 is preferably disposed between the connection portions 22 disposed at the central part and the connection portions 22 disposed at the outer-peripheral part. In the example shown in FIG. 5, four antenna terminals 21 are disposed so as to surround two connection portions 22 located at the central part of the antenna substrate 20. Furthermore, twelve connection portions 22 located at the outer-peripheral part are disposed so as to surround four antenna terminals 21.

According to the above-mentioned configuration, the effects of preventing a high-frequency signal or the like with respect to the antenna terminal 21 from being affected by disturbance or preventing transition of signal generated between the antenna terminals 21 is obtained. Particularly, in the case in which the connection portion 22 has the same electrical potential as that of GND, the aforementioned effects is significantly obtained.

Note that, the number of the antenna terminals 21 or the connection portions 22 can be appropriately changed. For example, as shown in FIG. 6, heat dissipation effect may be upgraded by increasing the number of the connection portions 22.

Note that, the technical scope of the invention is not limited to the above embodiments, and various modifications may be made without departing from the scope of the invention.

For example, although the second heat dissipation pattern 23 is formed on the antenna substrate 20 in each of the aforementioned embodiments, the above-described second heat dissipation pattern 23 may be omitted. Moreover, the connection portion 22 that is used to connect the heat dissipation pattern 15 to the second heat dissipation pattern 23 may be omitted.

In other cases, replacement of the constituent parts of the above embodiments with well-known parts may be made without departing from the scope of the invention, and furthermore the above-described embodiments or modified examples may be appropriately combined.

For example, of the above-described first to fifth embodiments, two, three, or more configurations may be combined.

DESCRIPTION OF REFERENCE NUMERALS

1 and 1A to 1D . . . radio communication module, 10 . . . mounting substrate, 11 . . . first surface, 12 . . . second surface, 13 . . . heat-dissipation via hole, 15 . . . heat dissipation pattern, 20 . . . antenna substrate, 20*a* . . . opposed face, 21 . . . antenna terminal, 22 . . . connection portion, 23 . . . second heat dissipation pattern, 30 . . . IC package, 40 . . . underfill, 51 . . . first heatsink member, 53 . . . second heatsink member

The invention claimed is:

1. A radio communication module, comprising:
   a mounting substrate having a first surface and a second surface;
   an antenna substrate mounted on the first surface; and
   an IC package that is mounted on the second surface and includes an RFIC, wherein
   the mounting substrate includes a heat-dissipation via hole that penetrates through the mounting substrate and extends between the first surface and the second surface, a heat dissipation pattern that is formed on the first surface and is connected to the heat-dissipation via hole, and a non-heat-dissipation via hole that transmits an electrical signal or electrical current, which are formed on thereon, and
   in a plan view when viewed from a thickness direction of the mounting substrate, the heat-dissipation via hole is connected to the RFIC at a position at which the heat-dissipation via hole overlaps with the RFIC, and the heat dissipation pattern extends to an outside of the antenna substrate.

2. The radio communication module according to claim 1, wherein
   a gap is provided between the antenna substrate and the mounting substrate.

3. The radio communication module according to claim 1, wherein
   the antenna substrate includes a second heat dissipation pattern that is formed on an opposed face of the antenna substrate which faces the mounting substrate, and
   the second heat dissipation pattern is connected to the heat dissipation pattern.

4. The radio communication module according to claim 3, further comprising:
   an underfill that is provided around a connection portion between the second heat dissipation pattern and the heat dissipation pattern, the underfill being in contact with the second heat dissipation pattern and the heat dissipation pattern.

5. The radio communication module according to claim 3, further comprising:
   a plurality of connection portions, each of which connects the second heat dissipation pattern to the heat dissipation pattern, and
   when viewed in a plan view, the plurality of the connection portions are disposed at both a central part and an outer-peripheral part of the antenna substrate.

6. The radio communication module according to claim 5, wherein
   the antenna substrate includes an antenna terminal that transmits a signal between the antenna substrate and the RFIC, and
   when viewed in a plan view, the antenna terminal is disposed between the connection portion that is disposed at the central part and the connection portion that is disposed at the outer-peripheral part.

7. The radio communication module according to claim 1, further comprising:
   a first heatsink member that is provided on a surface of the IC package which is opposite to the mounting substrate.

8. The radio communication module according to claim 1, further comprising:
   a second heatsink member that is provided at a position different from the antenna substrate on a surface of the heat dissipation pattern in the plan view.

9. The radio communication module according to claim 1, wherein
   the heat dissipation pattern has a same electrical potential as that of GND.

* * * * *